(12) United States Patent
Kane

(10) Patent No.: US 8,578,374 B2
(45) Date of Patent: Nov. 5, 2013

(54) SYSTEM AND METHOD FOR MANAGING VIRTUAL MACHINES

(75) Inventor: John P. Kane, Tafton, PA (US)

(73) Assignee: CA, Inc., Islandia, NY (US)

( * ) Notice: Subject to any disclaimer, the term of this patent is extended or adjusted under 35 U.S.C. 154(b) by 630 days.

(21) Appl. No.: 12/504,297

(22) Filed: Jul. 16, 2009

(65) Prior Publication Data

US 2011/0016467 A1  Jan. 20, 2011

(51) Int. Cl.
*G06F 9/455* (2006.01)
*G06F 9/46* (2006.01)
*G06F 7/04* (2006.01)

(52) U.S. Cl.
USPC .................. 718/1; 718/104; 726/1; 726/2

(58) Field of Classification Search
USPC .............. 718/1–105; 717/120–122, 168–178; 726/1–10, 16–29; 713/150–186; 709/201–203, 217–219, 223–226, 709/238–240
See application file for complete search history.

(56) References Cited

U.S. PATENT DOCUMENTS

| | | | |
|---|---|---|---|
| 7,551,922 B2 | 6/2009 | Roskowski et al. | 455/423 |
| 7,552,279 B1 | 6/2009 | Gandler | 711/114 |
| 7,555,541 B2 | 6/2009 | Mandal et al. | 709/220 |
| 7,562,349 B2 | 7/2009 | Fleischer et al. | 717/122 |
| 7,565,535 B2 | 7/2009 | Roberts et al. | 713/168 |
| 8,032,942 B2* | 10/2011 | Smith et al. | 726/27 |
| 8,341,270 B2* | 12/2012 | Mazzaferri et al. | 709/227 |
| 2007/0250833 A1* | 10/2007 | Araujo et al. | 718/1 |
| 2008/0134175 A1* | 6/2008 | Fitzgerald et al. | 718/1 |
| 2008/0301770 A1* | 12/2008 | Kinder | 726/2 |
| 2008/0320583 A1* | 12/2008 | Sharma et al. | 726/12 |
| 2009/0113072 A1* | 4/2009 | Little | 709/244 |
| 2009/0119664 A1* | 5/2009 | Pike et al. | 718/1 |
| 2009/0328170 A1* | 12/2009 | Williams et al. | 726/7 |
| 2010/0023996 A1* | 1/2010 | Sabin et al. | 726/1 |

\* cited by examiner

*Primary Examiner* — Abdullah Al Kawsar
(74) *Attorney, Agent, or Firm* — Baker Botts, L.L.P.

(57) ABSTRACT

In some embodiments, a method for virtual machine management includes receiving a request for a first virtual machine from a virtual host. The method also includes comparing the request for the first virtual machine to a policy. The policy includes rules that govern access to a plurality of virtual machines. In addition, the method includes providing the virtual host access to a second virtual machine in response to comparing the request for the first virtual machine to the policy.

20 Claims, 2 Drawing Sheets

SYSTEM AND METHOD FOR MANAGING VIRTUAL MACHINES

TECHNICAL FIELD

This disclosure relates generally to the field of virtual machines and more particularly to a system and method for managing virtual machines.

BACKGROUND

Virtual machines are increasingly being used by enterprises for access to applications and other functions. With increased usage, however, come management and security problems. Issues with virtual machine sprawl (also known as "image sprawl" or "virtual sprawl") currently provide challenges to the efficient and secure usage of virtual machines. Examples of this include an inability to keep track of who is using which version of a virtual machine and/or an inability to determine whether the correct virtual machines are being used. For example, it is fairly trivial to create a virtual machine for a particular application; yet, this feature may cause management problems because a variety of virtual machines may be created and actively used. This may lead to problems with compliance and change management. The proliferation of virtual machines may make it difficult to keep track of licensing requirements. This proliferation may also make it hard to keep track of how widespread security vulnerabilities have an effect in a deployment infrastructure. Further, derivative virtual machines may lead to similar problems. In addition, applying updates to a deployment of virtual machines may be problematic due to virtual machine sprawl.

SUMMARY

In some embodiments, a method for virtual machine management includes receiving a request for a first virtual machine from a virtual host. The method also includes comparing the request for the first virtual machine to a policy. The policy includes rules that govern access to a plurality of virtual machines. In addition, the method includes providing the virtual host access to a second virtual machine in response to comparing the request for the first virtual machine to the policy.

In some embodiments, comparing the request for the first virtual machine to the policy may include determining if a location describing the origin of the request is authorized to access the first virtual machine. Comparing the request for the first virtual machine to the policy may include determining if the request for the virtual machine was made during an authorized time interval. The method may further include receiving a request sent to an operating system from a virtual host for a third virtual machine. In addition, the method may include comparing the request for the third virtual machine to the policy. Also, the method may include directing the operating system to indicate to the virtual host that the third virtual machine is not available in response to comparing the request for the virtual machine to the policy.

In some embodiments, a system for virtual machine management includes a policy database comprising a plurality of policies. The policies include rules that govern access to a plurality of virtual machines. The system also includes a policy engine. The policy engine is configured to receive a request for a first virtual machine formulated by a virtual host. The policy engine is also configured to compare the request for the first virtual machine to a policy of the plurality of policies. In addition, the policy engine is configured to indicate a second virtual machine in response to comparing the request for the first virtual machine to the policy.

Depending on the specific features implemented, particular embodiments may exhibit some, none, or all of the following technical advantages. Access to virtual machines may be managed to improve security measures. Access to custom virtual machines may be policed. During maintenance periods, access to virtual machines may be limited. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
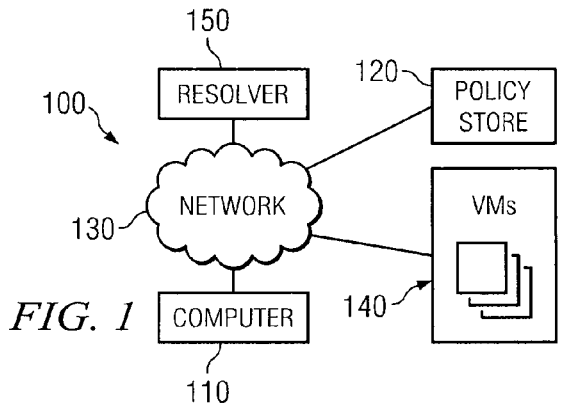
FIG. 1 illustrates one embodiment of a system for managing virtual machines.

FIG. 1 illustrates one embodiment of a system 100 for managing virtual machines. System 100 includes computer 110, policy store 120, virtual machine store 140, and resolver 150 all coupled to each other through network 130. System 100 may be configured to handle requests for virtual machines according to policies stored in policy store 120. For example, computer 110 may request a virtual machine. In various embodiments, the request may be formed in response to a user of computer 110 requesting the virtual machine, in response to software stored in computer 110, or in response to communication received by computer 110 from one or more nodes coupled to network 130 (such nodes may include nodes not depicted in FIG. 1).

In some embodiments, resolver 150 may receive the request through network 130. Resolver 150 may utilize policy store 120 in order to respond to the received request. Policy store 120 may contain policies that govern usage of virtual machines. By comparing the request to these policies, resolver 150 and/or policy store 120 may determine an appropriate virtual machine with which to respond to the request, as further described below with respect to FIGS. 2-3. In some situations, resolver 150 and/or policy store 120 may determine that the request for the virtual machine should not be responded to with any virtual machines. This may occur for several reasons. For example, a policy may specify that the user that formulated the request for the virtual machine does not have rights to access the requested virtual machine.

If a suitable virtual machine is determined to be responsive to the request, resolver 150 may communicate such a response to computer 110. In some embodiments, this communication may contain a reference to virtual machine store 140 where the appropriate virtual machine may be retrieved. In other embodiments, resolver 150 may retrieve the virtual machine from virtual machine store 140 and communicate the virtual machine to computer 110. In such a manner, issues associated with virtual machine sprawl (as described above) may be addressed. For example, the policies may be configured to not allow access to virtual machines that are undergoing maintenance.

In various embodiments, a blending of Hierarchical Storage Management (HSM) and mainframe dataset version management principles may be utilized in managing virtual machines, as may be seen from the description below regarding FIGS. 2-3.

Although several components of system 100 are depicted as separate entities coupled by network 130 in FIG. 1, some or all the entities may be combined, in some embodiments, into various suitable combinations. For example, functionality provided by resolver 150 may be provided by one or more elements within computer 110. As another example, functionality provided by virtual machine store 140 may also be provided by one or more elements within computer 110. In yet another example, functionality provided by policy store 120 and resolver 150 may be combined into one entity coupled to network 130. In some embodiments, all of the elements described in system 100 may be provided in one entity such that the communication described above does not occur across network 130 but within the one entity. Further details of such embodiments and other embodiments is described below with respect to FIGS. 2-3.

Network 130, in some embodiments, is a communicative platform operable to exchange data or information. Network 130 could be a plain old telephone system (POTS). In various embodiments, network 130 could be any packet data network offering a communications interface or exchange between any two nodes in system 100. Network 130 may alternatively be any local area network (LAN), metropolitan area network (MAN), wide area network (WAN), wireless local area network (WLAN), virtual private network (VPN), intranet, Internet, or any other appropriate architecture or system that facilitates communications in a network or telephonic environment, including a combination of any networks or systems described above. Network 130 may also include wireless technology such as WiMAX, LTE, or any of a variety of cellular data networks.

In some embodiments, each of nodes 110, 120, 140, and 150 may comprise a computer that may be used to access network 130. In particular embodiments, these nodes may be representative of a cellular telephone, an electronic notebook, a laptop, a personal digital assistant (PDA), or any other suitable device (wireless or otherwise), component, or element capable of communicating with one or more elements within system 100. Further details of these and other embodiments are given below with respect to FIGS. 2A-2D.

Figure 2A:
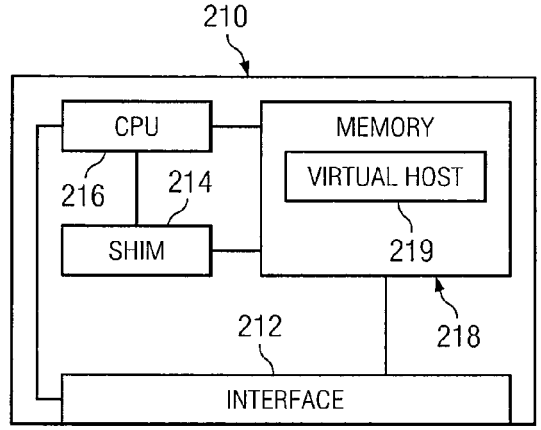
FIGS. 2A-2D illustrate exemplary embodiments of components that may be used to implement a system for managing virtual machines.
Figure 2B:
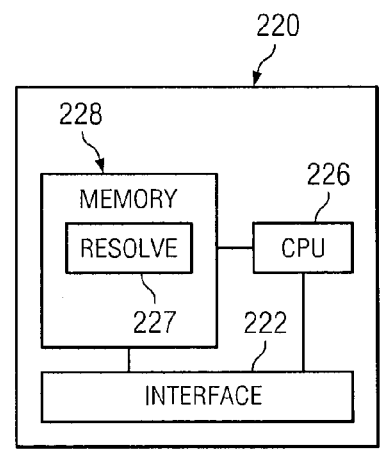
Figure 2C:
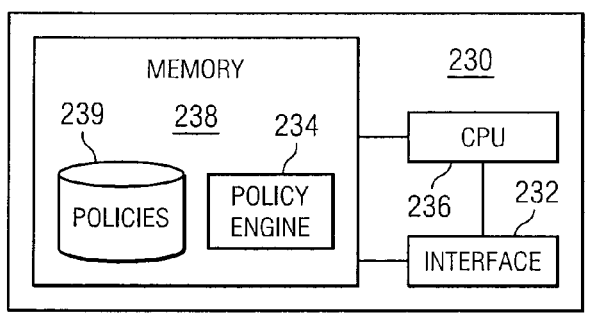
Figure 2D:
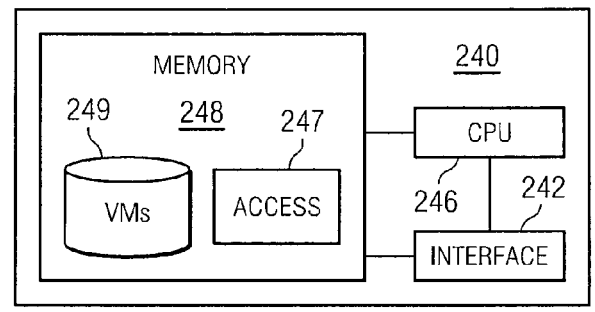

FIGS. 2A-2D describe exemplary embodiments of components that may be used to implement system 100. FIG. 2A illustrates one embodiment of device 210 that formulates a request for a virtual machine. The device includes interface 212, CPU 216, and memory 218. The device also includes shim 214 and virtual host program 219. FIG. 2B illustrates one embodiment of resolving device 220. Resolving device 220 includes interface 222, CPU 226, and memory 228. Resolving device 220 may also include resolve module 227. FIG. 2C illustrates one embodiment of a policy device 230. Policy device 230 may include interface 232, CPU 236, and memory 238. Policy device 230 may also include policy database 239 and policy engine 234. FIG. 2D illustrates one embodiment of a virtual machine store 240. Virtual machine store 240 includes interface 242, CPU 246, and memory 248. Virtual machine store 240 may also include access module 247 and virtual machine database 249.

CPUs 216, 226, 236, and 246, in some embodiments, may include one or more processing elements. Such processing elements may include a microprocessor, controller, application specific integrated circuit (ASIC), and/or a field programmable gate array (FPGA). In various embodiments, graphics processors may be used. Examples of suitable processor architectures include x86, x86-64, POWER, ARM, RISC, multi-core, SoC, DSP, and MIPS. The processing elements may be selected based on optimized use cases for a desktop, laptop, handheld, mobile, server, or other suitable form factors.

Memory modules 218, 228, 238, and 248, in some embodiments, may include memory elements such as files, stacks, databases, or other suitable forms of data. They may also store programs. The memory elements may include tangible, computer-readable mediums. The memory elements may include random access memory, read-only memory, CD-ROM, SD-type cards, removable memory devices or other suitable devices that allow storage and/or retrieval of data. Optical forms of storage may also be used, such as solid-state drives. Memory elements may also be capable of being accessible through a network, such that any of memory modules 218, 228, 238, and 248 may be located in a remote network location. The memory elements may be configured in various optimized configurations, such as suitable RAID configurations.

In particular embodiments, interfaces 212, 222, 232, and 242 may each include user interface elements and/or network interface elements. User interface elements may include keyboards, mice, touchpads, touch screens, microphones, optical receivers, or any other component suitable for inputting information. User interface elements may also include projectors, OLED screens, LCDs, CRT monitors, LED monitors, or any other suitable device or devices for displaying information. Network interface elements may include network cards, antennas, optical communication ports, modems, or any other suitable components for communicating information.

The functionality of any of CPUs 216, 226, 236, and 246, memory modules 218, 228, 238, and 248, and/or interfaces 212, 222, 232, and 242 may be combined into one or more devices as may be desired. Computing clusters and/or distributed computing architectures may be formed by using the components described in FIGS. 2A-2D. In some embodiments, combining the functionality provided by the components in FIGS. 2A-2D may lead to some of the components in FIGS. 2A-2D being removed. For example, if the functionality of policy device 230 is combined with resolving device 220, any or all of CPU 236, memory 238, and/or interface 232 may be removed and their functionality may be provided by the respective component within resolving device 220. Such combinations and/or substitutions may similarly be made for any of the devices and components depicted in FIGS. 2A-2D.

Policy database 239 and virtual machine database 249 may, in some embodiments, be stored within memory modules 238 and 248, respectively. They may include one or more databases in a variety of combinations. The databases may be row-oriented or column-oriented. They may include relational databases and/or object-oriented databases. In some embodiments, these databases may be accessed using the LDAP and/or X.400 protocols. Databases 239 and 249 may be indexed and accessed in a variety of manners, including by utilizing an operating system or through one or more networks.

Virtual host program 219, resolve module 227, access module 247, and policy engine 234 may each include one or more programming elements stored in a memory medium. The programming elements may include compiled software operable to execute on one or more processing elements to provide the functionality described above and below. They each may be operable to execute within a virtual machine, a conventional operating system, or over a network such as through a browser or plug-in architecture. Programming elements may also include scripts or script-based programming structures, such as those created using languages like Python or Ruby. Programming elements may further include network applications configured to be accessed through a browser. In some embodiments, virtual host 219 may include products such as VMWARE, XEN, MS VIRTUAL SERVER, and/or GHOST images.

Shim 214, in some embodiments, may be a kernel-level module operable to intercept requests for virtual machines within an operating system. Shim 214 may operate in a manner that is transparent to the user or application requesting the virtual machine. For example, a user may request a virtual machine using interface 212 to interact with virtual host 219. Virtual host 219, in this example, may send the request to the underlying operating system. Shim 214 may intercept this request and process it as described above. This interception may not be perceptible to virtual host 219 or the user since virtual host 219 may merely await a response from the operating system after sending the request. In some embodiments, shim 214 may operate in a manner that is perceptible to the user or program requesting the virtual machine. For example, shim 214 may send messages to the user or program that requested the virtual machine indicating progress on fulfilling the request or indicating errors regarding fulfilling the request. In some embodiments, shim 214 may provide the capability to analyze requests for virtual machines that are stored within device 210 rather than a virtual machine stored in virtual machine store 240. Hence, for example, a user may create a custom virtual machine that resides on the user's computer. Use of this virtual machine may go unmonitored since a request through the network is not needed. However, when the user directs virtual host 219 to open the custom virtual machine, shim 214 may be configured to intercept the request and allow the request to be analyzed before providing access to the custom virtual machine. This may be advantageous in that it may allow for the monitoring of custom virtual machines.

In an example operation, a user may interact with virtual host 219 through interface 212. The user may indicate, using interface 212, a desire to load a virtual machine within virtual host 219. Virtual host 219 may then formulate a request for the virtual machine indicated by the user. Shim 214 may send the request to another entity to be fulfilled. A response to the request may be received by interface 212 and communicated to virtual host 219 via shim 214. In some embodiments, the response may be communicated to virtual host 219 without the use of shim 214. The response may also be sent to virtual host 219 without the use of interface 212. For example, the response to the request may be generated by a module (not depicted) within memory 218 and communicated to virtual host 219 through a medium such as a computer bus.

In some embodiments, resolve module 227 may be configured to receive a request for a virtual machine through interface 222. Resolve module 227 may also be configured to transmit the request for the virtual machine so that the request may be compared to one or more policies. Resolve module 227 may also receive the results of the comparison of the request for the virtual machine to one or more policies through interface 222. In response to receiving the request for a virtual machine, resolve module 227 may also be configured to send: a reference to a virtual machine, an actual virtual machine, and/or a message indicating that the requested virtual machine could not be found through interface 222. Thus, in some embodiments, devices 210 and 220 may be able to communicate and collaborate. For example, a request for a virtual machine formulated by virtual host program 219 and handled by shim 214 may be transmitted through interfaces 212 and 222 to resolve module 227. Further, resolve module 227 may send a reference to a virtual machine in response to receiving the request for a virtual machine to virtual host 219 via interfaces 222 and 212 as well as shim 214.

In some embodiments, policy device 230 may receive a request for a virtual machine through interface 232. Policy engine 234 may analyze the request for the virtual machine and compare it to one or more policies stored in policy database 239. In some embodiments, policies may be specific for a particular virtual machine or a group of virtual machines or may be specific for one or more users. Policies may be specific for a group of users or roles in an environment. Policies may also be specific to a time interval or to a location (physical) or to a portion of a network. Based on such a comparison, policy engine 234 may determine which virtual machine should be utilized in response to the request for the virtual machine. Policies within policy database 239 may contain a set of rules that determine how virtual machines should be used. They may also contain rules that determine which virtual machines should be used at any given time. For example, a policy may indicate that a particular version of a virtual machine should not be used because it is out of date. Policies stored in policy database 239 may be added, removed, or modified utilizing interface 232 either directly by a user or over a network. For example, one or more policies may be modified to require the use of a particular version of a virtual machine. This may be the case when a new version of a virtual machine has been made available. This may also occur when it is determined that a problem exists with the current version of the virtual machine and that a previous version of the virtual machine should be used.

Through interface 232, policy device 230 may be operable to interact with other devices such as resolving device 220. For example, a request for a virtual machine may be transmitted from resolving device 220 to policy engine 234 using interface 232. After comparing the request to the policy database 239, policy engine 234 may respond, for example, with a virtual machine, a particular version of a virtual machine, or a reference to a virtual machine This response may be communicated through interface 232 to resolve module 227. In some situations, policy engine 234 may determine based on one or more policies stored in policy database 239 that no virtual machine should be made available in response to the request for the virtual machine. This may be indicated by policy device 230 in a message to resolve module 227.

In some embodiments, virtual machine store 240 may provide access to one or more virtual machines stored in virtual machine database 249 utilizing access module 247. For example, a request for a virtual machine may be received through interface 242 and passed to access module 247. Access module 247 may then retrieve the requested virtual machine from virtual machine database 249 and send it to interface 242 to be sent out. In various embodiments, virtual machine store 240 may be configured to interact with several other devices. For example, resolving device 220 may receive a request for a virtual machine and send it to be compared to one or more policies by sending it to policy device 230. Resolving device 220 may receive a reference to a virtual machine in response to the request for the virtual machine from policy device 230 and may transmit that reference to virtual machine store 240 utilizing interfaces 222 and 242. Utilizing access module 247 and virtual machine database 249, virtual machine store 240 may respond to resolving device 220 with the referenced virtual machine. In various embodiments, virtual machine store 240 may receive a request for a virtual machine from device 210 through interface 212 and may similarly respond with the requested virtual machine. Device 210 may send such a request to virtual machine store 240 after a request formulated at device 210 for a virtual machine has been compared to one or more policies and a reference to a suitable virtual machine has been provided to device 210.

In some embodiments, virtual machine store 240 may store several characteristics regarding the virtual machines in memory 248. These characteristics may include: business service(s) they support, applications (including versions and maintenance level) that they contain, date/time of last update, date/time of creation, date/time of owner, location where the virtual machine of record is stored, location(s) where the virtual machine is being used, date/time of when the virtual machine was last used, operating system type (including version and maintenance level) that they contain, devices (virtual), filesystems (both those within the virtual machine, and those accessed remotely, on a SAN for example), database types (Oracle, MS SQL, etc.) including versions and maintenance level, databases (including logical (user assigned) names, table names, and DNS names), language edition, audit status flag and audit details (if a virtual machine has to be signed off by an auditor before it can be used or not, if so who was the auditor that signed off, when did they sign off, etc.), and retention criteria (minimum number of versions of this virtual machine to retain, whether a virtual machine can be archived or deleted, etc.) Such characteristics may be used to access virtual machine database 249 and in policy rules governing such access. Other characteristics may be added as necessary. Reports may be generated utilizing any of this data as well as policies regarding any or a group of the virtual machines.

In some embodiments, policy device 230 and/or virtual machine store 240 may provide low level analysis of every image (real or virtual) in virtual machine database 429 and maintain information about how they are configured, how they are patched, components/products they contain, etc. Policy device 230 and/or virtual machine store 240 may also store the results of this analysis, and, in some embodiments, provide access to this information to other devices, such as device 210 or resolving device 220.

Policy device 230 and/or virtual machine store 240 may be configured, in various embodiments, to define "gold standard" configurations of virtual machines. Components of device 210 (such as shim 214), resolving device 220, policy device 230, and/or virtual machine store 240 may operate in a manner that allows for the automatic detection that a given virtual image configuration has varied from that gold standard. This may be accomplished using the techniques discussed above as well as the following description regarding FIG. 3.

In particular embodiments, the components of FIG. 2 may also automatically track where virtual machines are being used, where they have been checked out, who has old versions of virtual machines that need to be replaced and may ensure against unauthorized erasure, archiving, and/or destruction of a given version of a virtual machine while it is under retention control. For example, shim 214 may operate to detect and/or intercept attempts to access, archive, or delete a virtual machine. Shim 214 may send this information to resolving device 220 such that these operations may be compared to policies stored in policy device 230. Such activities may be logged as well as prohibited or allowed as a result of the comparison to the policies. Shim 214 may also operate to enforce the results of the comparison to the policies stored at policy device 230. For example, shim 214 may disallow the destruction of a virtual machine or prevent the archiving a version of a virtual machine. Shim 214 may, in some embodiments, be operating at a kernel-level of the operating system while providing some or all of these features.

Figure 3:
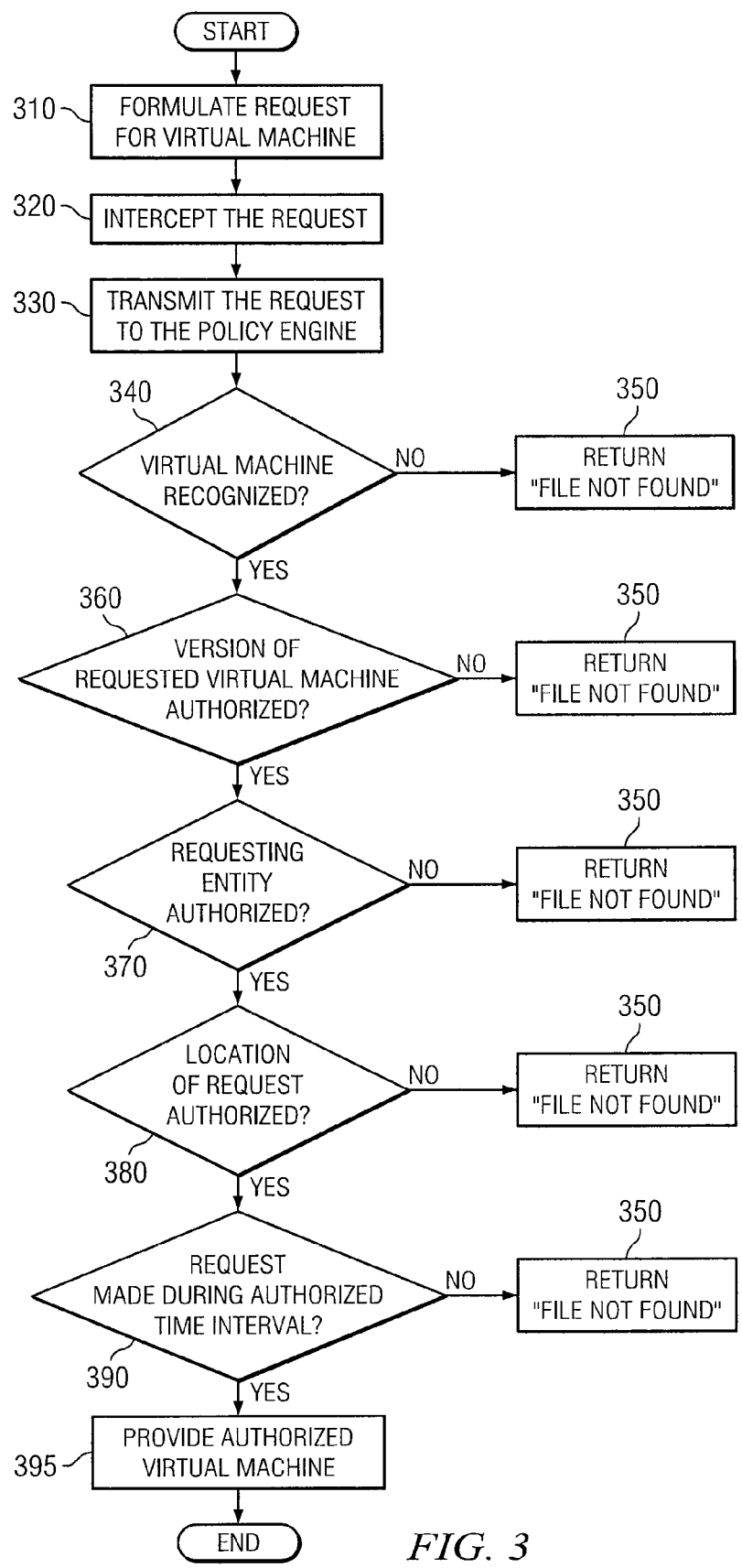
FIG. 3 is a flowchart illustrating one embodiment of the operation of a system for managing virtual machines.

FIG. 3 is a flow chart illustrating one embodiment of the operation of a system for managing virtual machines. In general, the steps illustrated in FIG. 3 may be combined, modified, or deleted where appropriate, and additional steps may also be added to the example operation. Furthermore, the described steps may be performed in any suitable order. In some embodiments, FIGS. 1-2 and the accompanying descriptions may provide suitable methods of implementing the steps recited below.

At step 310, in some embodiments, a request for a virtual machine is formulated. The request may be initialized by a user utilizing a virtual host or it may be initialized by a program. For example, a user may desire to launch an application, such as a finance application, that may be provided by a virtual machine. In some embodiments, the user may request the virtual machine using a virtual host or hypervisor. The request for the virtual machine may be made based on information already known by the user. For example, the user may desire to request a virtual machine that is present on the file system of the user's computer or may request a virtual machine that the user believes is available through a network coupled to the computer of the user. In some cases, the user may request a particular version or the most current version of a particular virtual machine. The examples described above may also apply to a program requesting a virtual machine. The ability for users or programs to request and load virtual machines in a variety of ways may lead to problems associated with virtual machine sprawl. For example, a user may request a virtual machine that is out-of-date or vulnerable to security problems. As discussed further below, requests for virtual machines may be managed to overcome some or all of these difficulties.

At step 320, in some embodiments, the request for the virtual machine may be intercepted. In various embodiments, this may be done in a manner that is transparent to the entity requesting the virtual machine. For example, if a user requests a virtual machine through a virtual host, the fact that the request has been intercepted may not be perceptible to the user and/or to the virtual host. In some embodiments, the request may be intercepted by a shim that may be installed on an operating system in which the request for the virtual machine was formed. For example, the shim may be a kernel module that is installed on the operating system such that requests for virtual machines sent to the operating system are handled by the shim. Hence, in such an example, the request for the virtual machine may appear to be handled by standard operating system procedures to the entity formulating the request but is actually intercepted in a transparent manner by the system for managing virtual machines.

At step 330, in some embodiments, the request for the virtual machine may be transmitted to a policy engine. The policy engine may be located on a network coupled to the device on which the request for the virtual machine was formulated or may be located within the device on which the request for the virtual machine was formulated. In some embodiments, the request for the virtual machine may be transmitted to the policy engine through one or more intermediate nodes. The intermediate nodes may be software modules installed within the device on which the request was formulated or within other devices coupled by a network to the device on which the request for the virtual machine was formulated. In some embodiments, the transmission of the request for the virtual machine to the policy engine may not be perceptible by the entity that formulated the request for the virtual machine such as a user requesting a virtual machine through a virtual host or hypervisor.

At step 340, in some embodiments, the policy engine may determine if the requested virtual machine is recognized. The policy engine may refer to one or more policies coupled to the policy engine to determine if the requested virtual machine is recognized. A variety of techniques may be utilized to determine if the virtual machine is recognized. For example, hashes or digital signatures may be used to identify the requested virtual machine. As another example, the name of the virtual machine may be examined. In some situations, the requested virtual machine may not be recognized. For example, if a user created a custom virtual machine that was not subject to any policies, the requested virtual machine may not be recognized. In situations when the virtual machine is not recognized, an indication that the requested virtual machine was not found may be returned to the entity requesting the virtual machine, such as in step 350. This may be accomplished, for example, by using a shim, another kernel-level module, or any other suitable hardware and/or software. In some embodiments, the "file not found" message may be transmitted to the requesting entity in a manner that is similar to a situation in which the underlying operating system could not retrieve the requested virtual machine. If the requested virtual machine is recognized, then the request for the virtual image may continue to be analyzed as in step 360. One or more policies may be added, modified, or deleted as may be necessary to properly evaluate the requested virtual machine. For example, if a new virtual machine is added to the system, a hash or digital signature corresponding to the new virtual machine (or a new version of an existing virtual machine) may be stored in one or more policies so that a request for the new virtual machine may be recognized.

At step 360, in some embodiments, it may be determined whether a version of the requested virtual machine or a requested version of a virtual machine is authorized. In some embodiments, the policy engine may select one or more policies that apply to the recognized virtual machine in the request and examine the version of the requested virtual machine by comparing it to the one or more selected policies. If the one or more policies indicate that the requested version of the virtual machine is not authorized, then the policy engine may determine if any version of the requested virtual machine is authorized, such as in step 362. If there are not any versions of the requested virtual machines that are authorized for use, then a "file not found" message may be returned in response to the request for the virtual machine, such as in step 350. However, if the requested version of the virtual machine is authorized or if a different version of the requested virtual machine is authorized, then the authorized version of the requested virtual machine may be further analyzed such as in step 370. One or more policies may be added, modified, or deleted as may be necessary to properly evaluate the version of the requested virtual machine. For example, if it is determined that a version of a virtual machine should be decommissioned, one or more policies may be modified so that the require access to a previous or newer version of the virtual machine. As another example, compliance management and/or license management may also be taken into account here. A version of a virtual machine may be available only to a limited number of users due to licensing restrictions. The policy engine may be able to determine such limitations from one or more policies and evaluate a request for a version of a virtual machine based on these considerations.

At step 370, in some embodiments, the entity that requested the virtual machine may be analyzed to determine if it is authorized to access the requested virtual machine. The policy engine may determine whether or not the entity requesting the virtual machine is authorized by referencing one or more policies associated with the entity or with the requested virtual machine. For example, the policy engine may determine that the requesting entity is not authorized because the requesting entity does not have sufficient privileges to access the requested virtual machine. This may be true when a user that has responsibilities in a financial area is requesting access to a virtual machine that provides functionality in a different area such as logistics or system infrastructure. The rules of one or more policies governing access to users may be configured in a role-based fashion or any other suitable configuration. This may allow, for example, users operating in one role to be prevented from accessing virtual machines that do not correspond to their roles. Such an authorization scheme can also apply to the situation when the requesting entity is a program. For example, a program used to update a database may request a virtual machine that is outside of its role. This may occur due to malicious control over the program, such as by a hacker. Hence, the examples and principles that apply to a user being unauthorized to access a virtual machine may also apply to computing entities being unauthorized to access the virtual machine. In various embodiments, temporary changes to the status of a user may lead to a user being unauthorized to access a virtual machine. For example, if a user is not actively working (e.g., a sabbatical or a vacation), a policy may reflect that the user is unable to access a virtual machine during that time. A user may also be permanently denied access to a virtual machine (e.g., a user was fired). If it is found that the requesting entity is not authorized to access a virtual machine, a "file not found" message may be returned such as in step 350. However, if the requesting entity is authorized to access the requested virtual machine, then the request may be further analyzed as in step 380. One or more policies may be added, modified, or deleted to effectively manage access to virtual machines. For example, a new user may be added to one or more policies giving the new user access to one or more virtual machines. As another example, if a user has changed positions, one or more policies may be added or modified to reflect the change so that the user only has access to the virtual machines needed to complete the tasks associated with the position the user currently has.

At step 380, in some embodiments, the location from which the request for the virtual machine originated is analyzed to determine if it is authorized. This may be done in accordance with one or more policies that govern the location, the user, and/or the requested virtual machine. The location may refer to the physical location of the system from which the request originated such as a physical address or a location in a building. The location may also refer to a virtual location of the machine such as an IP address or a location on a network. It may be determined that the location from which the request originated is not authorized. For example, a user may request a virtual machine from the user's home but the policy that governs the virtual machine may indicate that that virtual machine may only be accessed from the workplace. Analyzing the origin of virtual machine requests may help to stop hackers or other forms of unauthorized access through networks such as the Internet. As another example, it may be determined that the request for the virtual machine originates from an IP address not part of a set of IP addresses that is authorized to access the requested virtual machine; this may occur when a hacker remotely requests the virtual machine. In such cases, one or more policies may dictate that access to the virtual machine not be granted based on the location from which the request originated. If the location is not authorized, then a "file not found" type message may be returned such as in step 350. If the location is authorized, then further analysis of the request may be performed such as in step 390. One or more policies may be added, modified, or deleted as may be necessary to properly evaluate the location of the request for the virtual machine. For example, as roles or functions are moved to different locations (physical and/or virtual), one or more policies may be updated so that virtual machines that provide functionality needed to carry out the roles or functions may be accessed at the appropriate locations.

At step 390, in some embodiments, the request for the virtual machine may be analyzed to determine if the time when the virtual machine is requested is during an authorized time interval. For example, one or more policies may indicate that a virtual machine may only be accessed during certain time periods of the day. This may be the case when the uses of the virtual machine should be authorized during specified time intervals such as business hours. For example, if a virtual machine is used for accounting purposes, a policy may indicate that access to that virtual machine should only be done during regular business hours. In another example, a virtual machine may be used in a point-of-sale application such that it should only be accessible during regular business hours. Other situations may also call for determining appropriate time intervals. For example, if the virtual machines are being updated during a maintenance period it may be determined that requests to access the virtual machine should not be granted if the requested virtual machine is currently undergoing maintenance. In such a manner, scheduled maintenances may be implemented securely and efficiently. As may be apparent from the preceding examples, one or more policies may be added, modified, or deleted as may be necessary to properly evaluate the time during which virtual machine was requested.

If the request is not made during an authorized time interval, a "file not found" message may be returned such as in step 350. However, if the request is made during an authorized time interval the requested virtual machine may be provided as in step 395. If not already present on a locally available mount point to the entity that formulated the request, a copy of the virtual machine may be moved to where it can be accessed by the requesting entity. For example, it may be moved to either a network accessible drive or a drive physically attached to the requesting entity. In such situations, checks may be made to ensure that the copy of the virtual machine may be moved successfully, such as check if there is sufficient filesystem space to copy the virtual machine. Providing the authorized virtual machine may be done in a manner that is transparent to the user or entity requesting the virtual machine. In some situations, this may mean that the user or entity requesting the virtual machine may not appreciate that the request was compared to one or more policies. The requested virtual machine may be provided using a kernel-level module such as a shim to pass a reference to the requested virtual machine or the actual virtual machine to the program that requested the virtual machine, such as a virtual host or hypervisor.

The steps recited above may be interchanged or combined as appropriate. For example, it may be determined that in certain situations it is more efficient to analyze the request for the virtual machine by comparing one aspect of the virtual machine first and then another. For example, the request for the virtual machine may be analyzed with respect to its location before the request is analyzed with respect to the entity that promulgated the request. Decisions on how the various aspects of the request for the virtual machine may be analyzed may be based on factors associated with each of the aspects. These may include the number of entities that could possibly request a virtual machine, the number of virtual machines, the number of locations, and the number of available time intervals. More than one aspect of the request for the virtual machine may also be analyzed during one step.

Although various embodiments have been described above, numerous alterations may be made to the disclosed embodiments without departing from the scope of the invention.

What is claimed is:

1. A computer-implemented method for virtual machine management executable on one or more processors, comprising:
   receiving a request for a first virtual machine on an operating system of a device in response to user interaction with the device, the first virtual machine stored on the device;
   comparing the request for the first virtual machine to a policy, the policy comprising rules that govern access to a plurality of existing virtual machines;
   determining a second virtual machine of the plurality of existing virtual machines in response to comparing the request for the first virtual machine to the policy, the second virtual machine being a different version of the first virtual machine;
   providing access to the second virtual machine in response to comparing the request for the first virtual machine to the policy by directing the operating system to provide the second virtual machine in response to the request for the first virtual machine;
   wherein the second virtual machine is a particular virtual machine that comprises a set of alterations;
   wherein the second virtual machine being the different version of the first virtual machine comprises the first virtual machine being the particular virtual machine without the set of alterations; and
   wherein comparing the request for the first virtual machine to the policy comprises comparing information associated with the set of alterations to the first virtual machine.

2. The method of claim 1, wherein comparing the request for the first virtual machine to the policy comprises determining if the user that initiated the request is allowed to access the first virtual machine.

3. The method of claim 1, wherein comparing the request for the first virtual machine to the policy comprises determining if a location describing the origin of the request is authorized to access the first virtual machine.

4. The method of claim 1, wherein comparing the request for the first virtual machine to the policy comprises determining if the request for the virtual machine was made during an authorized time interval.

5. The method of claim 1, further comprising:
   receiving a request sent to the operating system for a third virtual machine;
   comparing the request for the third virtual machine to the policy; and
   causing the operating system to indicate that the third virtual machine is not available in response to comparing the request for the virtual machine to the policy.

6. The method of claim 1, further comprising modifying the policy in response to upgrading at least one virtual machine of the plurality of existing virtual machines.

7. The method of claim 1, wherein:
   comparing the request for the first virtual machine to the policy comprises determining that the user is not allowed to access a latest version of the first virtual machine but is allowed to access an earlier version of the first virtual machine; and the second virtual machine being the different version of the first virtual machine comprises the second virtual machine being the earlier version of the first virtual machine.

8. A system for virtual machine management, comprising:
a policy database comprising a plurality of policies, wherein the policies comprise rules that govern access to a plurality of existing virtual machines; and
a processor configured to:
receive a request for a first virtual machine in response to user interaction with a device, the first virtual machine stored on the device;
compare the request for the first virtual machine to a policy of the plurality of policies;
determine a second virtual machine of the plurality of existing virtual machines in response to comparing the request for the first virtual machine to the policy, the second virtual machine being a different version of the first virtual machine;
cause the second virtual machine to be provided in response to comparing the request for the first virtual machine to the policy by causing an operating system of the device to provide the second virtual machine in response to the request for the first virtual machine;
wherein the second virtual machine is a particular virtual machine that comprises a set of alterations;
wherein the second virtual machine being the different version of the first virtual machine comprises the first virtual machine being the particular virtual machine without the set of alterations; and
wherein comparing the request for the first virtual machine to the policy comprises comparing information associated with the set of alterations to the first virtual machine.

9. The system of claim 8, wherein comparing the request for the first virtual machine to the policy comprises determining if the user that initiated the request is allowed to access the first virtual machine.

10. The system of claim 8, wherein comparing the request for the first virtual machine to the policy comprises determining if a location describing the origin of the request is authorized to access the first virtual machine.

11. The system of claim 8, wherein comparing the request for the first virtual machine to the policy comprises determining if the request for the virtual machine was made during an authorized time interval.

12. The system of claim 8, wherein:
the processor is operable to:
receive a request for a third virtual machine;
compare the request for the third virtual machine to a second policy of the plurality of policies; and
indicate that a virtual machine should not be provided in response to comparing the request for the third virtual machine to the second policy.

13. The system of claim 8, wherein the policy database is configured to allow the plurality of policies to be modified in response to upgrading at least one virtual machine of the plurality of existing virtual machines.

14. The system of claim 8, wherein:
comparing the request for the first virtual machine to the policy comprises determining that the user is not allowed to access a latest version of the first virtual machine but is allowed to access an earlier version of the first virtual machine; and
the second virtual machine being the different version of the first virtual machine comprises the second virtual machine being the earlier version of the first virtual machine.

15. A tangible, non-transitory, computer-readable medium comprising instructions that, when executed on one or more processors, are configured to:
receive a request for a first virtual machine sent to an operating system of a device in response to a user interacting with the device, the first virtual machine stored on the device;
compare the request for the first virtual machine to a policy, the policy comprising rules that govern access to a plurality of existing virtual machines;
determine a second virtual machine of the plurality of existing virtual machines in response to comparing the request for the first virtual machine to the policy, the second virtual machine being a different version of the first virtual machine;
cause the second virtual machine to be provided in response to comparing the request for the first virtual machine to the policy by causing the operating system to provide the second virtual machine in response to the request for the first virtual machine;
wherein the second virtual machine is a particular virtual machine that comprises a set of alterations;
wherein the second virtual machine being the different version of the first virtual machine comprises the first virtual machine being the particular virtual machine without the set of alterations; and
wherein comparing the request for the first virtual machine to the policy comprises comparing information associated with the set of alterations to the first virtual machine.

16. The medium of claim 15, wherein comparing the request for the first virtual machine to the policy comprises determining if the user that initiated the request is allowed to access the first virtual machine.

17. The medium of claim 15, wherein comparing the request for the first virtual machine to the policy comprises determining if a location describing the origin of the request is authorized to access the first virtual machine.

18. The medium of claim 15, wherein comparing the request for the first virtual machine to the policy comprises determining if the request for the virtual machine was made during an authorized time interval.

19. The medium of claim 15, wherein the instructions are further configured to:
receive a request sent to the operating system for a third virtual machine;
compare the request for the third virtual machine to the policy; and
indicate that the third virtual machine is not available in response to comparing the request for the virtual machine to the policy.

20. The medium of claim 15, wherein:
comparing the request for the first virtual machine to the policy comprises determining that the user is not allowed to access a latest version of the first virtual machine but is allowed to access an earlier version of the first virtual machine; and
the second virtual machine being the different version of the first virtual machine comprises the second virtual machine being the earlier version of the first virtual machine.

* * * * *